(12) United States Patent
Suzuno

(10) Patent No.: US 9,268,474 B2
(45) Date of Patent: Feb. 23, 2016

(54) INFORMATION PROCESSING APPARATUS, METHOD, AND NON-TRANSITORY COMPUTER-READABLE MEDIUM TO CONTROL DISPLAY OF A MAP

(75) Inventor: Satoshi Suzuno, Saitama (JP)

(73) Assignee: SONY CORPORATION, Tokyo (JP)

( * ) Notice: Subject to any disclaimer, the term of this patent is extended or adjusted under 35 U.S.C. 154(b) by 236 days.

(21) Appl. No.: 13/977,994

(22) PCT Filed: Nov. 18, 2011

(86) PCT No.: PCT/JP2011/006441
§ 371 (c)(1),
(2), (4) Date: Jul. 2, 2013

(87) PCT Pub. No.: WO2012/095919
PCT Pub. Date: Jul. 19, 2012

(65) Prior Publication Data
US 2013/0283205 A1  Oct. 24, 2013

(30) Foreign Application Priority Data
Jan. 13, 2011 (JP) ................................. 2011-005016

(51) Int. Cl.
*G06F 3/0485* (2013.01)
*G08G 1/0969* (2006.01)
*G01C 21/36* (2006.01)
*G09B 29/10* (2006.01)

(52) U.S. Cl.
CPC ............ *G06F 3/0485* (2013.01); *G01C 21/367* (2013.01); *G08G 1/0969* (2013.01); *G09B 29/106* (2013.01)

(58) Field of Classification Search
CPC ... G01C 21/367; G08G 1/0969; G06F 3/0458
See application file for complete search history.

(56) References Cited

U.S. PATENT DOCUMENTS

| | | | | |
|---|---|---|---|---|
| 4,825,381 | A | * | 4/1989 | Bottorf et al. ................. 701/532 |
| 5,913,918 | A | * | 6/1999 | Nakano et al. ................ 701/454 |
| 6,016,110 | A | * | 1/2000 | Takinami ................. 340/995.16 |
| 6,336,072 | B1 | | 1/2002 | Takayama et al. |
| 2001/0028350 | A1 | * | 10/2001 | Matsuoka et al. ............ 345/427 |
| 2001/0056443 | A1 | | 12/2001 | Takayama et al. |
| 2002/0099499 | A1 | | 7/2002 | Takayama et al. |
| 2002/0103597 | A1 | | 8/2002 | Takayama et al. |
| 2005/0222802 | A1 | | 10/2005 | Tamura et al. |
| 2006/0267959 | A1 | | 11/2006 | Goto et al. |

FOREIGN PATENT DOCUMENTS

| | | |
|---|---|---|
| JP | 2000-137564 | 5/2000 |
| JP | 2000-215211 | 8/2000 |
| JP | 2000-352520 | 12/2000 |

(Continued)

OTHER PUBLICATIONS

International Search Report issued Feb. 14, 2012 in PCT/JP2011/006441 filed Nov. 18, 2011.

*Primary Examiner* — Andrew Bee
(74) *Attorney, Agent, or Firm* — Hazuki International, LLC

(57) ABSTRACT

An information processing apparatus that includes a processor that controls a display to display map data; acquires first altitude data corresponding to a first point on the displayed map data and second altitude data corresponding to a second point on the displayed map data; and controls the display to scroll the map between the first point and the second point based on a difference between the first altitude data and the second altitude data.

21 Claims, 14 Drawing Sheets

(56) References Cited

FOREIGN PATENT DOCUMENTS

| | | |
|---|---|---|
| JP | 2004-108894 | 4/2004 |
| JP | 2006-330428 | 12/2006 |
| JP | 2007-10645 | 1/2007 |
| JP | 2007-304996 | 11/2007 |
| JP | 2008-188106 | 8/2008 |
| WO | WO 2004/020951 A1 | 3/2004 |

* cited by examiner

INFORMATION PROCESSING APPARATUS, METHOD, AND NON-TRANSITORY COMPUTER-READABLE MEDIUM TO CONTROL DISPLAY OF A MAP

TECHNICAL FIELD

The present disclosure relates to a map display control device, a map display control method, and a program, and particularly to a map display control device, a map display control method, and a program for displaying a display area of a map by scrolling.

BACKGROUND ART

In recent years, there have been provided various types of services based on map information. For example, a navigation device provides map information around a current position based on current position information. Further, we can easily view map information of entire world via the Internet. By reference to those pieces of map information, information on various facilities on the map can be obtained, for example.

Further, there is also considered a device for providing information on topography. For example, altitude value information is typically shown by drawing contour lines on a map. Alternatively, the altitude value information is shown by using different colors for each altitude value on the map. With those works, information on the altitude value can be provided visually. Further, in PTL 1, there is disclosed a device for providing a user with gradient physically by using special hardware. This device physically shows the change in the altitude value, that is, the gradient, by changing the neutral angle position of an operation section based on a gradient value.

CITATION LIST

Patent Literature

PTL 1: JP 2007-304996A

SUMMARY

Technical Problem

However, the device described in PTL 1 uses the special hardware. Consequently, there has been potentially demanded a device which can physically show the change in the altitude value also in a device having a general operation section such as a touch panel or a mouse.

In light of the foregoing, it is desirable to provide in the present disclosure a map display control device, a map display control method, and a program, which are novel and improved, and which can show the change in the altitude value by scroll speed variations.

Solution to Problem

According to a first exemplary embodiment, the disclosure is directed to an information processing apparatus that includes a processor that controls a display to display map data; acquires first altitude data corresponding to a first point on the displayed map data and second altitude data corresponding to a second point on the displayed map data; and controls the display to scroll the map between the first point and the second point based on a difference between the first altitude data and the second altitude data.

The information processing apparatus may further comprise a position detecting unit that detects a current position of the information processing apparatus, wherein the processor controls the display to display the current position of the information processing apparatus on the map data. The first point may correspond to the current position of the information processing apparatus displayed on the map data. The processor may control the display to display the map data on the display so that the current position of the information apparatus is displayed in the center of the display.

The processor may receive an input selecting the second point on the displayed map data.

The processor may acquire first position data corresponding to the first point and second position data corresponding to the second point, and calculate a distance between the first point and the second point based on the first position data and the second position data.

The processor may calculate a gradient between the first point and the second point based on the calculated distance between the first point and the second point and the difference between the first altitude data and the second altitude data, and control the display to scroll the map at a predetermined speed between the first point and the second point based on the calculated gradient.

The processor may control the display to scroll the map at a first speed between the first point and the second point when the gradient is a positive value, and control the display to scroll the map at a second speed between the first point and the second point when the gradient is a negative value, wherein the second speed is greater than the first speed.

The processor may be configured to receive an input selecting between one of a plurality of modes of transportation.

When the selected mode of transportation is a bicycle, an effect of the gradient on the scrolling speed is greater than in a case where the mode of transportation is a car.

When the selected mode of transportation is a bicycle, the processor controls the display to scroll at a speed such that the speed decreases with respect to a positive slope and increases with respect to a negative slope compared to when the mode of transportation is a car.

The information processing apparatus may further include a tilt sensor configured to detect a degree of tilt of the information processing apparatus, wherein the processor is configured to control the display to scroll the map at a speed determined based on the degree of tilt detected by the tilt sensor.

The processor may be configured to display a route on the displayed map data, and control the display to scroll in a direction following the displayed route, and the first and second points are points on the route.

The display may be a three-dimensional display and the map is displayed in a three-dimensional view.

The processor may be configured to determine a plurality of reference points between the first point and the second point, acquire altitude data corresponding to each of the plurality of reference points, and control the display to scroll the map between the first point and the second point based on a difference between the altitudes of each of the plurality of reference points. The reference points may be equally spaced between the first point and the second point.

The information processing apparatus may further include a touch-panel interface configured to receive a touch input selecting the first point and the second point by touching the interface at the first point and dragging the map to the second point. The processor may control the display to scroll the map data in a distance and direction corresponding to a difference between the first point and the second point based on the input received at the touch-panel interface.

The processor may control the display to scroll the map data in a distance and a direction opposite to a direction corresponding to a vector connecting the first point and the second point based on the input received at the touch-panel interface.

According to another exemplary embodiment, the disclosure is directed to a method performed by an information processing apparatus, the method comprising: controlling, by a processor, a display to display map data; acquiring, by the processor, first altitude data corresponding to a first point on the displayed map data and second altitude data corresponding to a second point on the displayed map data; and controlling, by the processor, the display to scroll the map between the first point and the second point based on a difference between the first altitude data and the second altitude data.

According to another exemplary embodiment, the disclosure is directed to a non-transitory computer-readable medium including computer program instructions, which when executed by an information processing apparatus, cause the information processing apparatus to perform a method comprising: controlling a display to display map data; acquiring first altitude data corresponding to a first point on the displayed map data and second altitude data corresponding to a second point on the displayed map data; and controlling the display to scroll the map between the first point and the second point based on a difference between the first altitude data and the second altitude data.

Advantageous Effects of Invention

According to the present disclosure described above, the change in the altitude value can be shown by the scroll speed variations.

DESCRIPTION OF EMBODIMENTS

Figure 1:
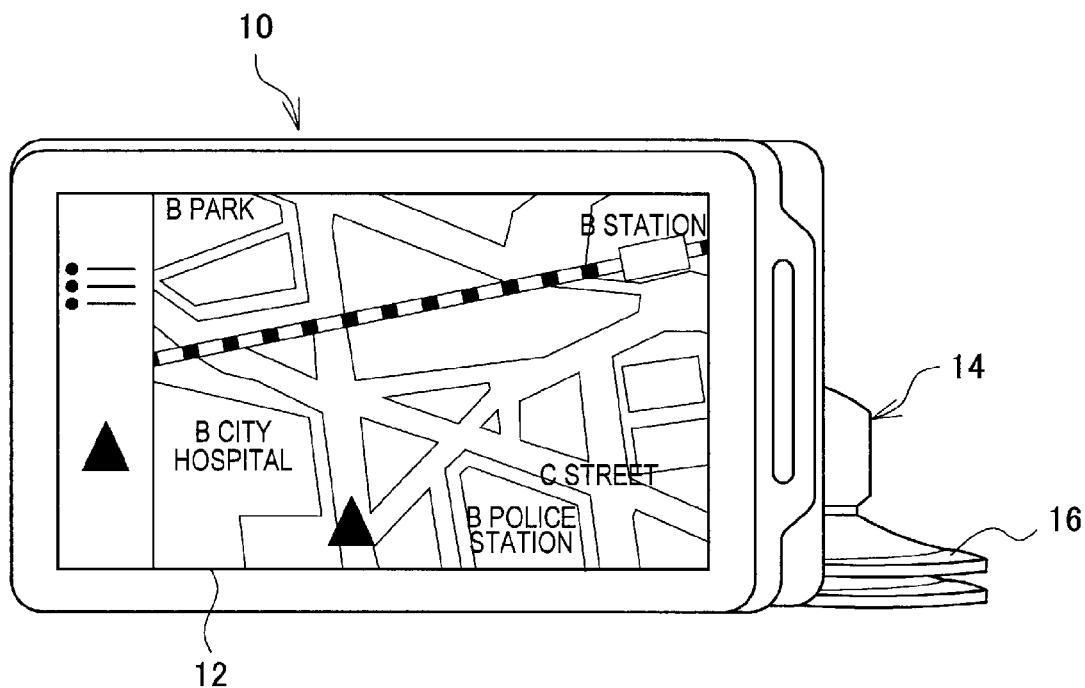
FIG. 1 is an external view of a PND according to a first embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description will be given in the following order. In the first embodiment, there is given a PND (Personal Navigation Device) as an example of a map display control device. Further, in the second embodiment, there is given a mobile phone as an example of the map display control device.

1. First embodiment
   1-1. Configuration
   1-2. Scroll action
   1-3. Determination of scroll speed
   1-4. Determination of reference point
2. Second embodiment
3. Examples of effects 1. First Embodiment (1-1. Configuration)

Figure 2:
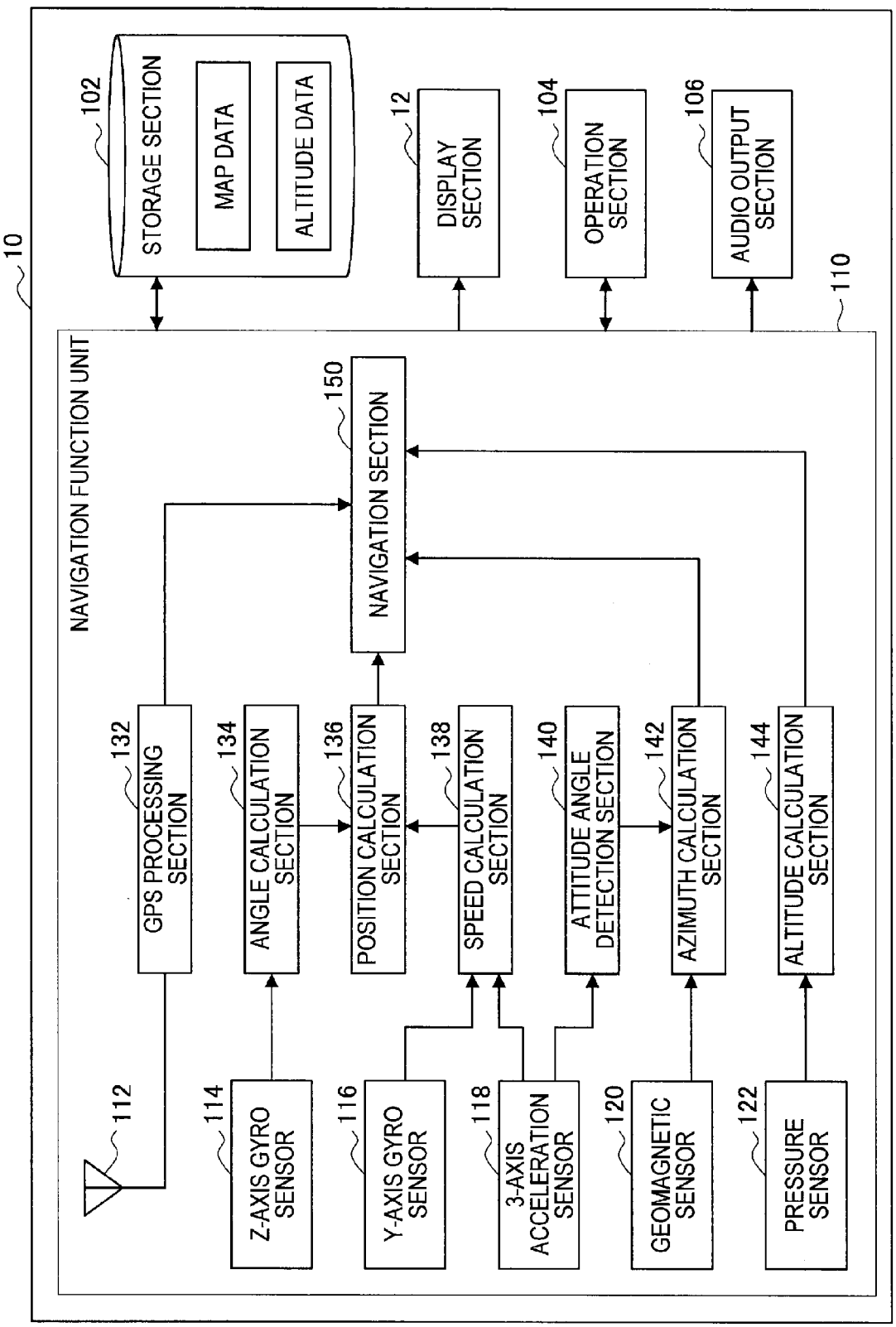
FIG. 2 is a block diagram showing a functional configuration of the PND according to the embodiment.
Figure 3:
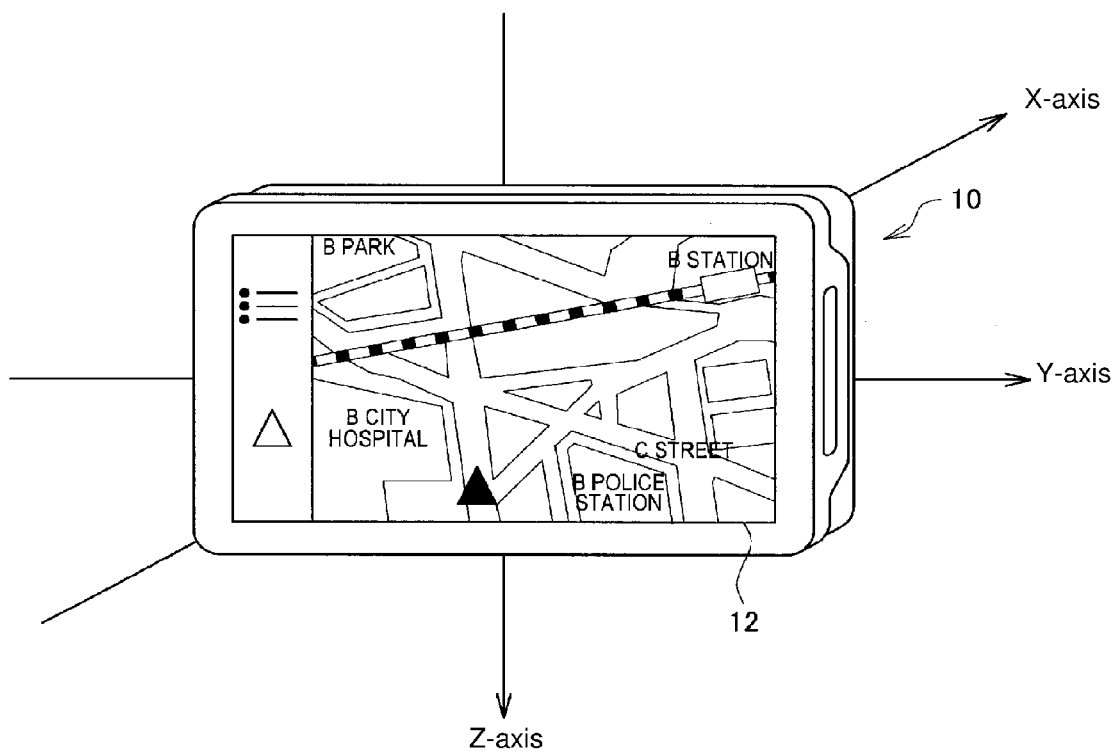
FIG. 3 is an explanatory diagram showing a coordinate system around the PND according to the embodiment.
Figure 4:
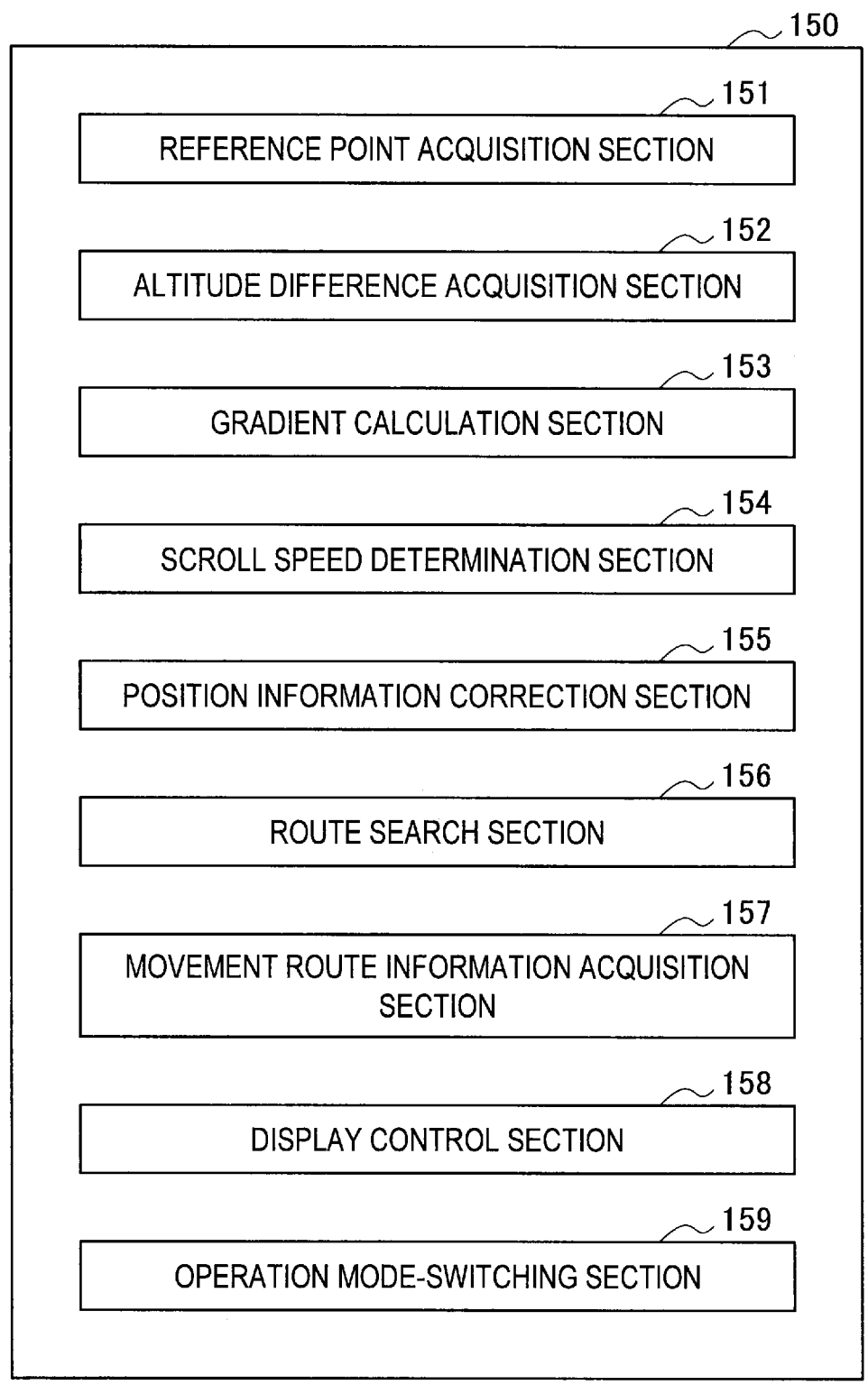
FIG. 4 is a block diagram showing a detailed functional configuration of a navigation section of the PND according to the embodiment.

First, with reference to FIGS. 1 to 4, there will be described a configuration of a PND that is an example of a map display control device according to a first embodiment of the present disclosure. FIG. 1 is an external view of the PND according to the first embodiment of the present disclosure. FIG. 2 is a block diagram showing a functional configuration of the PND according to the present embodiment. FIG. 3 is an explanatory diagram showing a coordinate system around the PND according to the present embodiment. FIG. 4 is a block diagram showing a detailed functional configuration of a navigation section of the PND according to the present embodiment.

Referring to FIG. 1, there is shown an example of the external view of a PND 10 which is an example of a map display control device according to an embodiment of the present disclosure. The PND 10 has functions of showing a route to a destination and providing a user with various types of information each associated with position information. The PND 10 has a display section 12 on the front surface thereof, which displays an image including an information providing screen for providing various types of information, and a casing thereof is held by a cradle 14 which is attached to a dashboard of a vehicle via a suction cup 16. The PND 10 can be easily attached to and also detached from the cradle 14.

The PND 10 has a function of acquiring current position information of the PND 10 itself, and stores map data. Therefore, the PND 10 can display on the display section 12 the current position information in a superimposed manner on a map. Further, the PND 10 can accept operation performed by a touch panel which is provided in an integrated manner with the display section 12 and can provide map information of a specified position. In the map display screen, a display area of the map information can be moved in accordance with scroll operation.

With reference to FIG. 2, a functional configuration of the PND 10 will be described. The PND 10 mainly includes the display section 12, a storage section 102, an operation section 104, an audio output section 106, and a navigation function unit 110. Note that, in the present embodiment, a display control function is provided as one of the functions of the navigation function unit.

The navigation function unit 110 mainly includes a GPS antenna 112, a Z-axis gyro sensor 114, a Y-axis gyro sensor 116, a 3-axis acceleration sensor 118, a geomagnetic sensor 120, a pressure sensor 122, a GPS processing section 132, an angle calculation section 134, a position calculation section 136, a speed calculation section 138, an attitude angle detection section 140, an azimuth calculation section 142, an altitude calculation section 144, and a navigation section 150.

The display section 12 is a display device which outputs a screen in which information indicating a current position is superimposed on map data, for example. The display section 12 may be a display device such as an LCD (Liquid Crystal Display) or an organic EL (Electroluminescence) display.

The storage section 102 is a storage medium which stores a program for the PND 10 to operate, map data, and the like. The map data may be a map downloaded from an external server that holds map data. Note that the storage section 102 may be, for example, a storage medium such as a non-volatile memory such as a Flash ROM (or Flash Memory), an EEPROM (Electrically Erasable Programmable Read-Only Memory), and an EPROM (Erasable Programmable ROM), a magnetic disk such as a hard disk and a disc-like magnetic disk, an optical disk such as a CD (Compact Disc), a DVD-R (Digital Versatile Disc Recordable), and a BD (Blu-Ray Disc (registered trademark)), and an MO (Magneto Optical) disk.

The operation section 104 accepts an operation instruction from the user, and outputs the operation contents to the navigation function unit 110. Examples of the operation instruction input by the user include setting a destination, enlarging/reducing the scale of a map, setting a vocal guidance, and setting a screen display. The operation section 104 may be a touch screen which is provided in an integrated manner with the display section 12. Alternatively, the operation section 104 may have a physical configuration such as a button, a switch, and a lever, which is provided separately from the display section 12. Further, the operation section 104 may be a signal reception section which detects a signal indicating an operation instruction by the user transmitted from a remote controller.

The audio output section 106 is an output device which outputs audio data, and may be a speaker and the like. The audio output section 106 outputs navigation audio guidance, for example. The user listens to the audio guidance, which enables the user to find out the route to take even without watching the display section 12.

The GPS antenna 112 is capable of receiving GPS signals from multiple GPS satellites, and inputs the received GPS signals to the GPS processing section 132. Note that the GPS signals received here include orbital data indicating orbits of the GPS satellites and information such as transmission time of the signals.

The GPS processing section 132 calculates position information indicating the current position of the PND 10 based on the multiple GPS signals input from the GPS antenna 112, and supplies the navigation section 150 with the calculated position information. Specifically, the GPS processing section 132 calculates a position of each of the GPS satellites from the orbital data obtained by demodulating each of the multiple GPS signals, and calculates a distance between each of the GPS satellites and the PND 10 from a difference between a transmission time and a reception time of the GPS signal. Then, based on the calculated positions of the respective GPS satellites and the distances from the respective GPS satellites to the PND 10, a current three-dimensional position is calculated.

In addition to the absolute position-acquisition function using the GPS antenna 112 and the GPS processing section 132, the navigation function unit 110 has a relative position-acquisition function using various sensors. Information of the relative position may be used in a situation where it is difficult for the PND 10 to acquire an absolute position, that is, in a situation where the PND 10 is at a position at which it is difficult to receive a GPS signal. Alternatively, the information of the relative position may be used in combination with the information of the absolute position.

The Z-axis gyro sensor 114 is a sensor having a function of detecting, as a voltage value, a yaw rate $W_z$ which is a variable velocity (angular velocity) of the rotation angle around the Z-axis when the PND 10 is rotated. The Z-axis gyro sensor 114 detects the yaw rate at a sampling frequency of 50 Hz, for example, and inputs data indicating the detected yaw rate to the angle calculation section 134. Note that, as shown in FIG. 3, the Z-axis corresponds to the vertical direction. The X-axis corresponds to a travelling direction of the PND 10, and the Y-axis corresponds to the horizontal direction that is perpendicular to the X-axis.

The angle calculation section 134 calculates an angle T of when the PND 10 is rotated by multiplying the yaw rate $W_z$ input from the Z-axis gyro sensor 114 by a sampling frequency (here, for example, 0.02 s), and inputs angle data indicating the angle T to the position calculation section 136.

The Y-axis gyro sensor 116 is a sensor having a function of detecting, as a voltage value, a pitch rate $W_y$ which is an angular velocity around the Y-axis. The Y-axis gyro sensor 116 detects the pitch rate at a sampling frequency of 50 Hz, for example, and inputs data indicating the detected pitch rate to the speed calculation section 138.

The 3-axis acceleration sensor 118 is a sensor having a function of detecting, as voltage values, an acceleration rate $A_x$ along the X-axis, an acceleration rate $A_y$ along the Y-axis, and an acceleration rate $A_z$ along the Z-axis. The 3-axis acceleration sensor 118 detects the acceleration rate $A_x$, the acceleration rate $A_y$, and the acceleration rate $A_z$ at a sampling frequency of 50 Hz, for example, and inputs data indicating the detected acceleration rates to the speed calculation section 138 and the attitude angle calculation section 140.

The speed calculation section 138 divides the acceleration rate $A_z$ along the Z-axis input from the 3-axis acceleration sensor 118 by the pitch rate $W_y$ input from the Y-axis gyro sensor 116, thereby calculating a speed V in the travelling direction 50 times per second, for example, and inputs the calculated speed V to the position calculation section 136.

The position calculation section 136 has a function of calculating position information of a current position based on the speed V calculated by the speed calculation section 138 and the angle T calculated by the angle calculation section 134. Specifically, the position calculation section 136 calculates an amount of change from the position at the previous calculation to the current position based on the speed V and the angle T. Then, the position calculation section 136 calculates current position information from the amount of change and the previous position. After that, the position calculation section 136 supplies the navigation section 150 with the position information of the current position.

The attitude angle calculation section 140 generates, to begin with, attitude angle data indicating an attitude angle of the PND 10 by performing a predetermined attitude angle detection processing based on the acceleration rate data $A_x$, $A_y$, and $A_z$ which are input from the 3-axis acceleration sensor 118, and inputs the attitude angle data to the azimuth calculation section 142.

The geomagnetic sensor 120 is a sensor having a function of detecting, as voltage values, geomagnetism $M_x$, geomagnetism $M_y$, and geomagnetism $M_z$ in the X-axis direction, the Y-axis direction, and the Z-axis direction, respectively. The geomagnetic sensor 120 inputs the detected geomagnetism data $M_x$, $M_y$, and $M_z$ to the azimuth calculation section 142.

The azimuth calculation section 142 performs a predetermined correction processing to the geomagnetism data $M_x$, $M_y$, and $M_z$ input from the geomagnetic sensor 120, and generates azimuth data indicating an azimuth of the PND 10 based on the corrected geomagnetism data and the attitude angle data input from the attitude angle calculation section 140. The azimuth calculation section 142 supplies the navigation section 150 with the generated azimuth data.

That is, the geomagnetic sensor 120, the 3-axis acceleration sensor 118, the attitude angle detection section 140, and the azimuth calculation section 142 each function as a so-called electronic compass and generates the azimuth data. Mainly in the case where the PND 10 is used by being detached from the cradle 14 (for example, in the case where the PND 10 is used when the user is walking), the navigation section 150 uses the azimuth data and provides the user with map data which is being displayed in a manner that the direction of the map data is adjusted to the direction of the PND 10. Note that, when the PND 10 is used by being installed in a car, the PND 10 may associate a road in the map data with the car position based on the route of the car position, and may provide the user with the map data, the direction of which is adjusted to the direction of the PND 10 based on the azimuth of the map. Alternatively, there can be provided the user with map data, the direction of which is adjusted to the direction obtained by calculating the direction of the PND 10 using an acquired GPS azimuth.

The pressure sensor 122 is a sensor having a function of detecting, as a voltage value, the surrounding pressure. The pressure sensor 122 detects the detected pressure data at a sampling frequency of 50 Hz, for example, and inputs the detected pressure data to the altitude calculation section 144.

The altitude calculation section 144 calculates the altitude of the PND 10 based on the pressure data input from the pressure sensor 122, and provides the navigation section 150 with the calculated altitude data.

According to the above configuration, the navigation section 150 is capable of acquiring the current position information from the GPS processing section 132 or the position calculation section 136, the azimuth that the PND 10 is heading for from the azimuth calculation section 142, and the altitude of the PND 10 from the altitude calculation section 144. Here, although the navigation section 150 can use the acquired information related to the position as it is, various corrections may be provided thereto. For example, a typical example of the correction processing includes map matching processing. The map matching processing is a technique which uses map information for correcting an error of the position information. With the map matching processing, relevant roads on the map are searched based on the change of the position information and correct position information is estimated, and based on the estimation, the position information is corrected. The navigation section 150 can show a route to a destination, for example, using the information of the current position of the PND 10. Further, the navigation section 150 can provide the user with various types of information based on the position information.

Here, with reference to FIG. 4, the main functions of the navigation section 150 will be described in more detail. The navigation section 150 mainly includes a reference point acquisition section 151, an altitude difference acquisition section 152, a gradient calculation section 153, a scroll speed determination section 154, a position information correction section 155, a route search section 156, a movement route information acquisition section 157, a display control section 158, and an operation mode-switching section 159.

Of those, the reference point acquisition section 151, the altitude difference acquisition section 152, the gradient calculation section 153, and the scroll speed determination section 154 are structures that are used when the display control section 158 scrolls a display area of a map. With the functions of those structures, the display control section 158 can scroll the display area of the map at a speed based on a gradient between two points on the map. Hereinafter, there will be described detailed structures for realizing this function.

The reference point acquisition section 151 has a function of acquiring position information of a first reference point which is a point within the display area that is an area displayed before the display area of the map is scrolled, and position information of a second reference point which is to be a reference of the display area of the map of a scroll destination. The method of determining the first reference point and the second reference point differs depending on the method for scroll operation. Accordingly, the method of determining the first reference point and the second reference point will be described below with specific examples.

The altitude difference acquisition section 152 has a function of acquiring information on the difference in altitude between two points. In the present embodiment, the altitude difference acquisition section 152 acquires altitude data of the two points (first reference point and second reference point) which are specified based on altitude data stored in the storage section 102, and calculates the difference between the acquired two pieces of altitude data, thereby acquiring the information on the altitude difference.

The gradient calculation section 153 calculates a distance between the first reference point and the second reference point based on the position information of the first reference point and the position information of the second reference point which are acquired by the reference point acquisition section 151. Then, the gradient calculation section 153 calculates the gradient between the first reference point and the second reference point based on the calculated distance between the first reference point and the second reference point, and the information on the altitude difference acquired by the altitude difference acquisition section 152.

The scroll speed determination section 154 determines the speed of the scrolling of the display area which displays the map based on the gradient between the first reference point and the second reference point. In this case, when the gradient is a positive value (that is, upward slope), the scroll speed determination section 154 decreases the speed. Further, when the gradient is a negative value (that is, downward slope), the scroll speed determination section 154 increases the speed.

The scroll speed determination section 154 may also determine the scroll speed further based on an operation mode according to the transportation means used by the user. In this case, for the operation mode, information on the operation mode determined by the operation mode-switching section 159, which will be described below, may be used. Note that examples of the transportation means include car, bicycle, walking, motorcycle, airplane, and train. Of those, in the case where the bicycle is used for travelling, for example, it is assumed that the effect on the user caused by the gradient of the road is greater than in the case where the user travels by car. Therefore, in the case where the transportation means is a bicycle, the scroll speed determination section 154 may determine the scroll speed such that the speed decreases with respect to the upward slope and the speed increases with respect to the downward slope compared to the case where the transportation means is a car.

Note that, the scroll action may be performed based on the user operation, or the scrolling along a movement route may be automatically performed by a route simulation function, which will be described below, based on the movement route information acquired by the movement route information acquisition section 157. In the latter case, the scroll speed determination section 154 may determine the scroll speed based on the information of the transportation means used in the route, which is included in the movement route information.

The position information correction section 155 has a function of correcting the position information provided to the navigation section 150. For example, the position information correction section 155 may correct the position information by performing map matching processing. Further, the position information correction section 155 may correct the absolute position information acquired by the GPS (Global Positioning System), with the use of detection values acquired by various types of sensors.

The route search section 156 has a function of searching for a route between two points. For example, the route search section 156 can search for a route from the current position to a specified destination. Further, the route search section 156 can search for a route in accordance with other specified conditions.

The movement route information acquisition section 157 has a function of acquiring information on a movement route. For example, the movement route information acquisition section 157 can acquire the information of the route for which the route search section 156 searched, as the movement route information. Alternatively, the movement route information acquisition section 157 may acquire, as the movement route information, movement history information (for example, GPS log) in which position information is associated with time information.

The display control section 158 controls the display on a screen performed by the display section 12. Particularly in the present embodiment, the display control section 158 has a function of controlling the display of the map such that the display area of the map is scrolled at the scroll speed determined by the scroll speed determination section 154. The scrolling may be executed in accordance with an input operation of the user, for example. Further, the scrolling may be executed automatically (not in accordance with the user operation) along a predetermined route. For example, in the case where the PND 10 has a route simulation function which causes the display area of the map to move along the predetermined route, the display control section 158 controls the display of the map by scrolling the display area of the map along the route. There will be described hereinafter, a scroll method including the relationship between an input operation and a method of controlling the display in the case where the scrolling is executed in accordance with an input operation of the user, and a method of determining a reference point in each scroll method.

The operation mode-switching section 159 has a function of switching operation modes of the PND 10. For example, the PND 10 may have an in-vehicle mode used when the PND 10 is installed on a car, a bicycle mode used when the PND 10 is installed on a bicycle, and a pedestrian mode used when the user of the PND 10 moves on foot. The operation mode-switching section 159 switches operation modes such that the PND 10 operates in any one of those operation modes. That is, the PND 10 has a different control program for each operation mode, and, with the use of a control program corresponding to an operation mode, it is controlled such that the operation corresponding to the operation mode is performed. The operation mode-switching section 159 may switch operation modes in accordance with the operation of the user to an operation mode-switching screen, for example. Further, the operation mode-switching section 159 may automatically switch the mode to the pedestrian mode when the PND 10 is detached from the cradle 14.

Heretofore, one example of the functions of the PND 10 according to the present embodiment has been shown. Each of the above structural elements may be configured using general-purpose members or circuits, or may be configured using hardware spe-cialized for the function of each structural element. Further, the function of each structural element may be realized by reading out, by an arithmetic unit such as a CPU (Central Processing Unit), a control program from the storage medium such as a ROM (Read Only Memory) or a RAM (Random Access Memory) that stores the control program in which procedures for realizing those functions are written, and by interpreting and executing the program. Therefore, the configuration to be used can be changed appropriately in accordance with the technical level each time when the embodiment is carried out.

Note that there may be produced a computer program for realizing each function of the PND 10 according to the present embodiment as described above, and the computer program can be implemented in a personal computer or the like. Further, there can also be provided a computer-readable recording medium in which the computer program is stored. Examples of the recording medium include a magnetic disk, an optical disk, a magneto-optical disk, and a flash memory. Further, the computer program may be distributed via a network, without using the recording medium, for example.

(1-2. Scroll Action)

Figure 5:
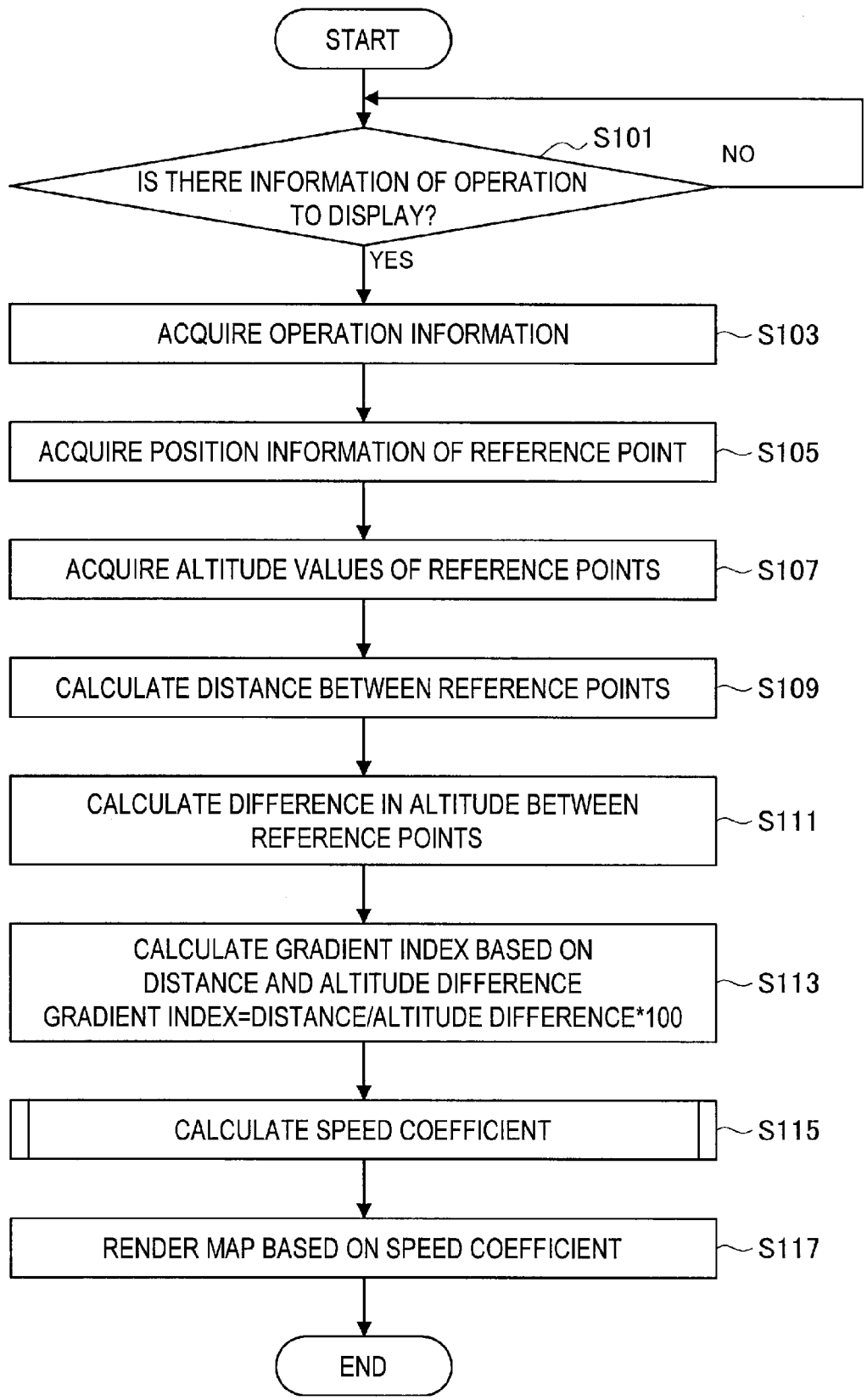
FIG. 5 is a flowchart showing a scroll action of the PND according to the embodiment.

Next, with reference to FIG. 5, a scroll action of the PND 10 will be described. FIG. 5 is a flowchart showing a scroll action of the PND according to the embodiment. First, the navigation section 150 determines whether there is information of operation to a display (S101). Then, in the case where the operation information is detected, the navigation section 150 acquires the operation information (S103). Next, the reference point acquisition section 151 acquires position information of a reference point (S105). After that, the altitude difference acquisition section 152 acquires altitude values of a plurality of reference points (S107).

Then, the gradient calculation section 153 calculates the distance between reference points based on the position information of the reference points (S109). After that, the altitude difference acquisition section 152 calculates the difference in altitude between two points based on the altitude values acquired in Step S107 (S111).

The gradient calculation section 153 calculates a gradient index based on the distance between the two reference points calculated in Step S109 and the difference in altitude between the two reference points calculated in Step S111 (S113).

Next, the scroll speed determination section 154 calculates a speed coefficient, thereby determining a scroll speed (S115). Then, the display control section 158 renders a map based on the speed coefficient calculated in Step S115, thereby controlling the display of the map (S117).

(1-3. Determination of Scroll Speed)

Figure 6:
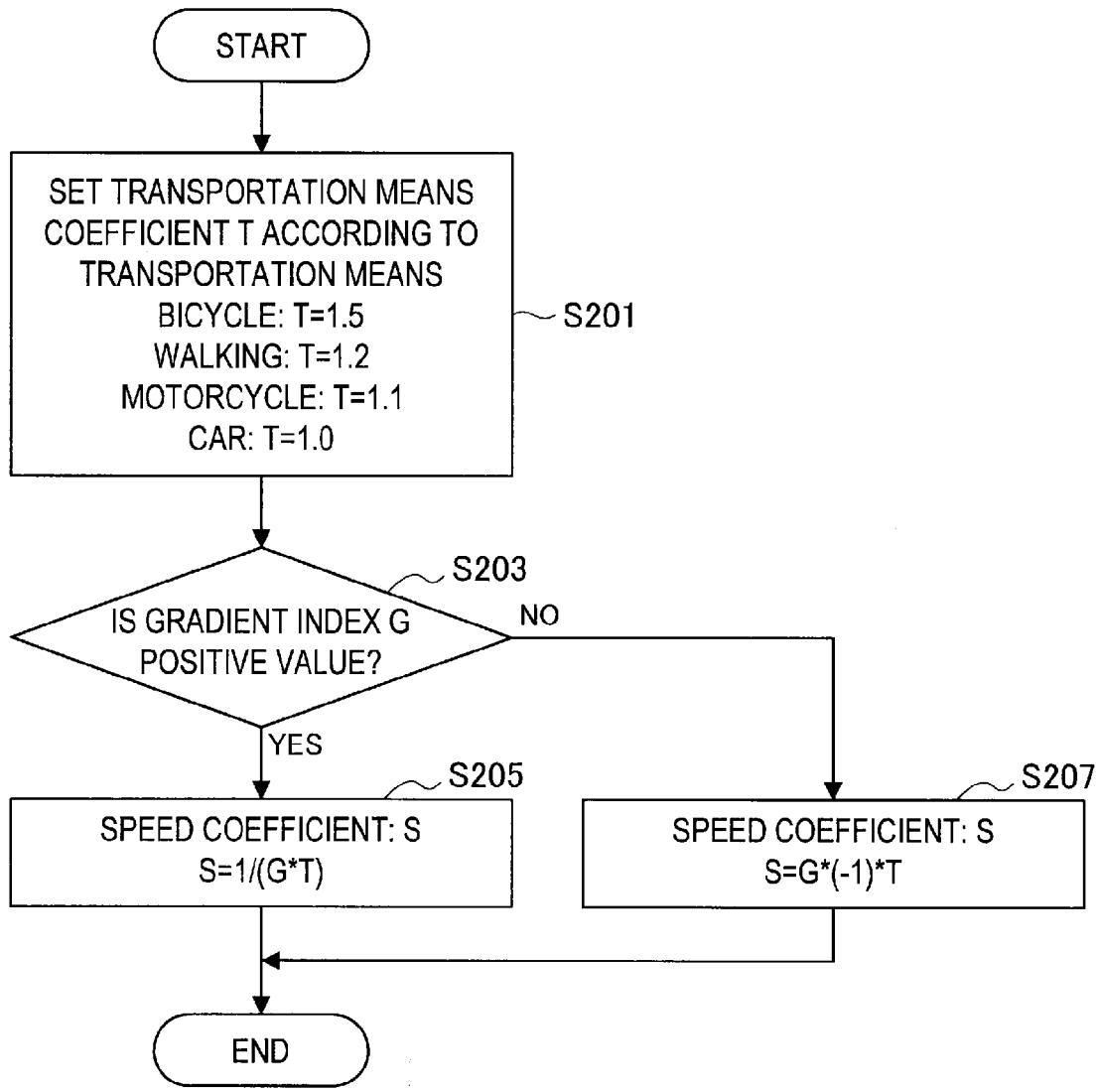
FIG. 6 is a flowchart showing speed coefficient calculation processing of the PND according to the embodiment.

Here, with reference to FIG. 6, there will be described determination processing of a scroll speed performed by calculating a speed coefficient. FIG. 6 is a flowchart showing speed coefficient calculation processing of the PND according to the embodiment.

First, the scroll speed determination section 154 determines a transportation means coefficient T according to the transportation means (S201). Here, for example, T represents 1.5 in the case where the transportation means used by the user is a bicycle, T represents 1.2 in the case where the transportation means used by the user is walking, T represents 1.1 in the case where the transportation means used by the user is a motorcycle, and T represents 1.0 in the case where the transportation means used by the user is a car.

Next, the scroll speed determination section 154 determines whether a gradient index G calculated by the gradient calculation section 153 is a positive value or a negative value (S203). Here, in the case where the gradient index G is a positive value, it is calculated as follows: speed coefficient $S=1/(G*T)$ (S205). On the other hand, in the case where the gradient index G is a negative value, it is calculated as follows: speed coefficient $S=G*(-1)*T$ (S207).

Although one example of the calculation formula has been shown in FIG. 6, the present disclosure is not limited to such an example. In the case where the gradient index G is a positive value, that is, in the case of an upward slope, the calculation formula may be determined such that the speed coefficient S represents a value smaller than 1. Further, in the case where the gradient index G is a negative value, that is, in the case of a downward slope, the calculation formula may be determined such that the speed coefficient S represents a value larger than 1. In this case, in the processing in Step S117 of FIG. 5 described above, a predetermined scroll speed that is to be a reference may be multiplied by the calculated speed coefficient S. According to the execution of such processing, the scroll speed becomes slower in the case of the upward slope, and the scroll speed becomes faster in the case of the downward slope. Further, in the case of the upward slope, it is preferred that the speed coefficient be determined such that steeper gradient slows down the scroll speed. It is the same for the downward slope, and in this case, it is preferred that the speed coefficient be determined such that the steeper downward slope increases the scroll speed.

(1-4. Determination of Reference Point)

Figure 7:
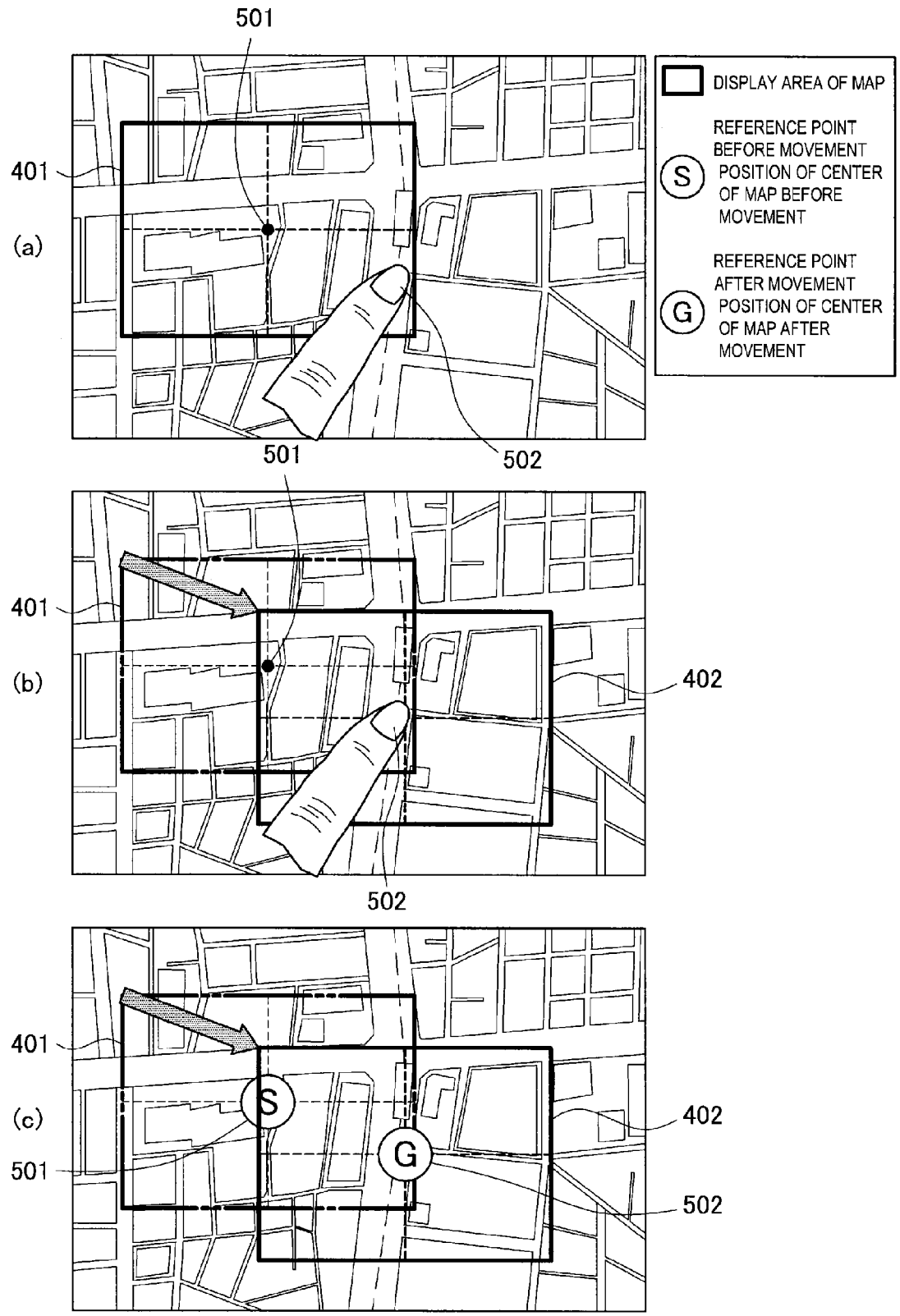
FIG. 7 is an explanatory diagram of a reference point related to determination of a scroll speed of the PND according to the embodiment.
Figure 8:
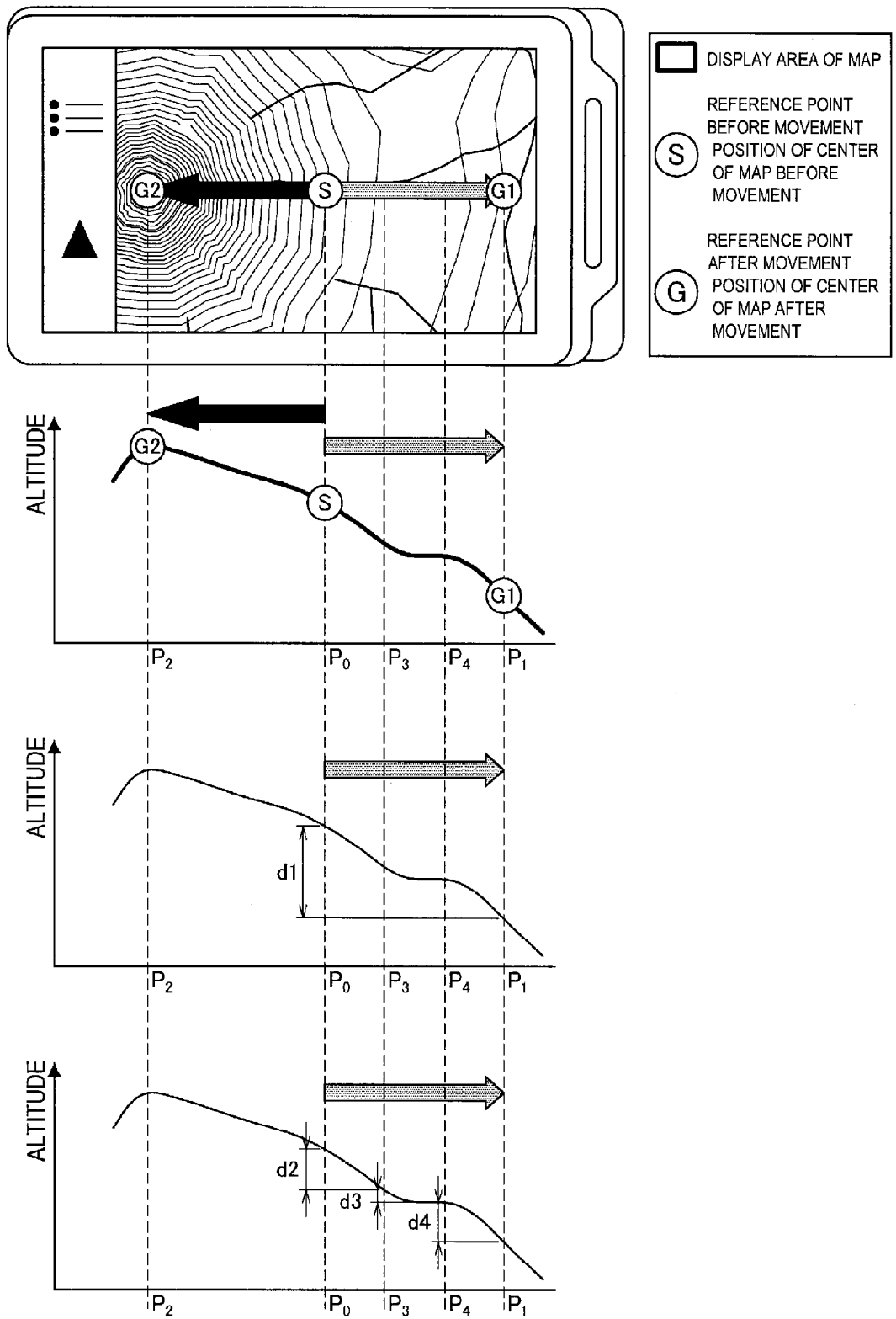
FIG. 8 is an explanatory diagram of a destination reference point related to the determination of a scroll speed of the PND according to the embodiment.
Figure 9:
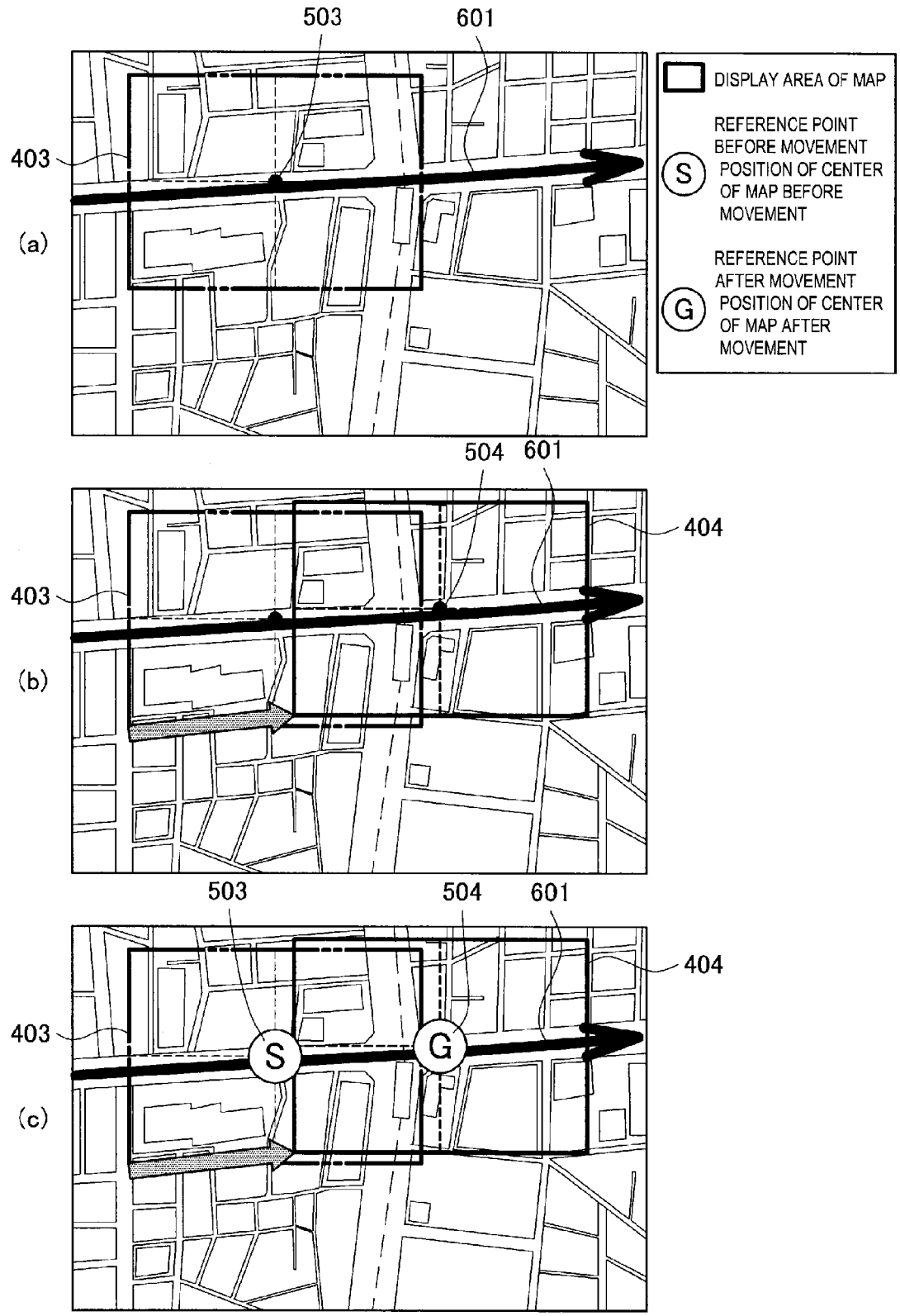
FIG. 9 is an explanatory diagram of a reference point related to determination of a scroll speed in a route simulation of the PND according to the embodiment.
Figure 10:
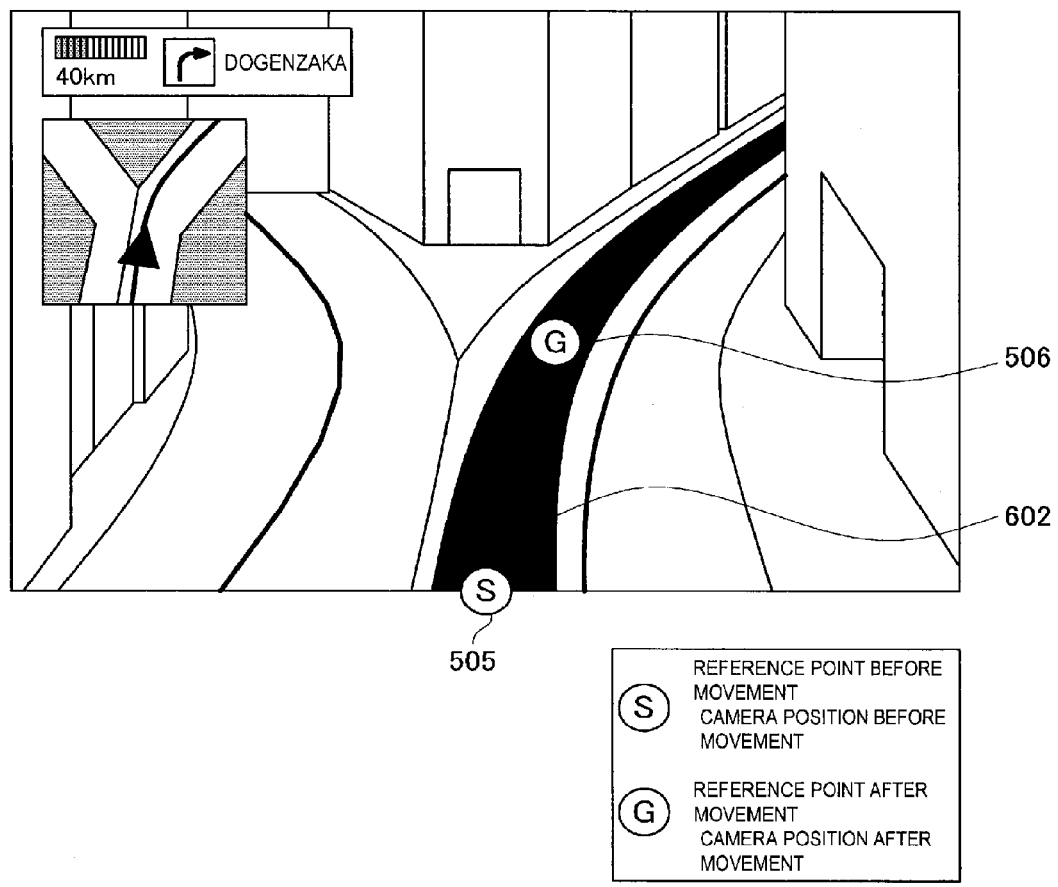
FIG. 10 is an explanatory diagram of a reference point related to determination of a scroll speed in a three-dimensional display of the PND according to the embodiment.
Figure 11:
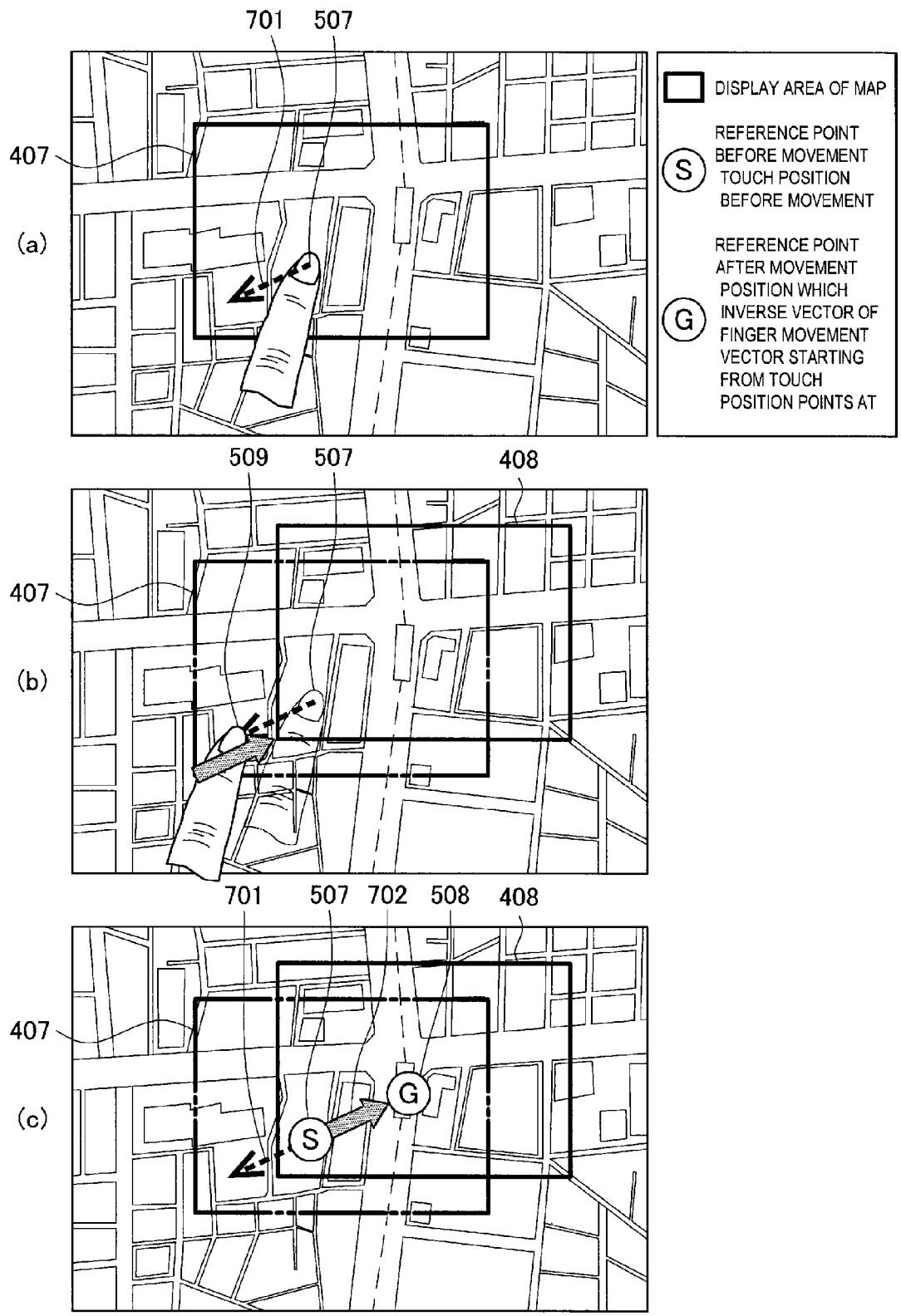
FIG. 11 is an explanatory diagram of a reference point related to determination of a scroll speed in a first modified example of the PND according to the embodiment.
Figure 12:
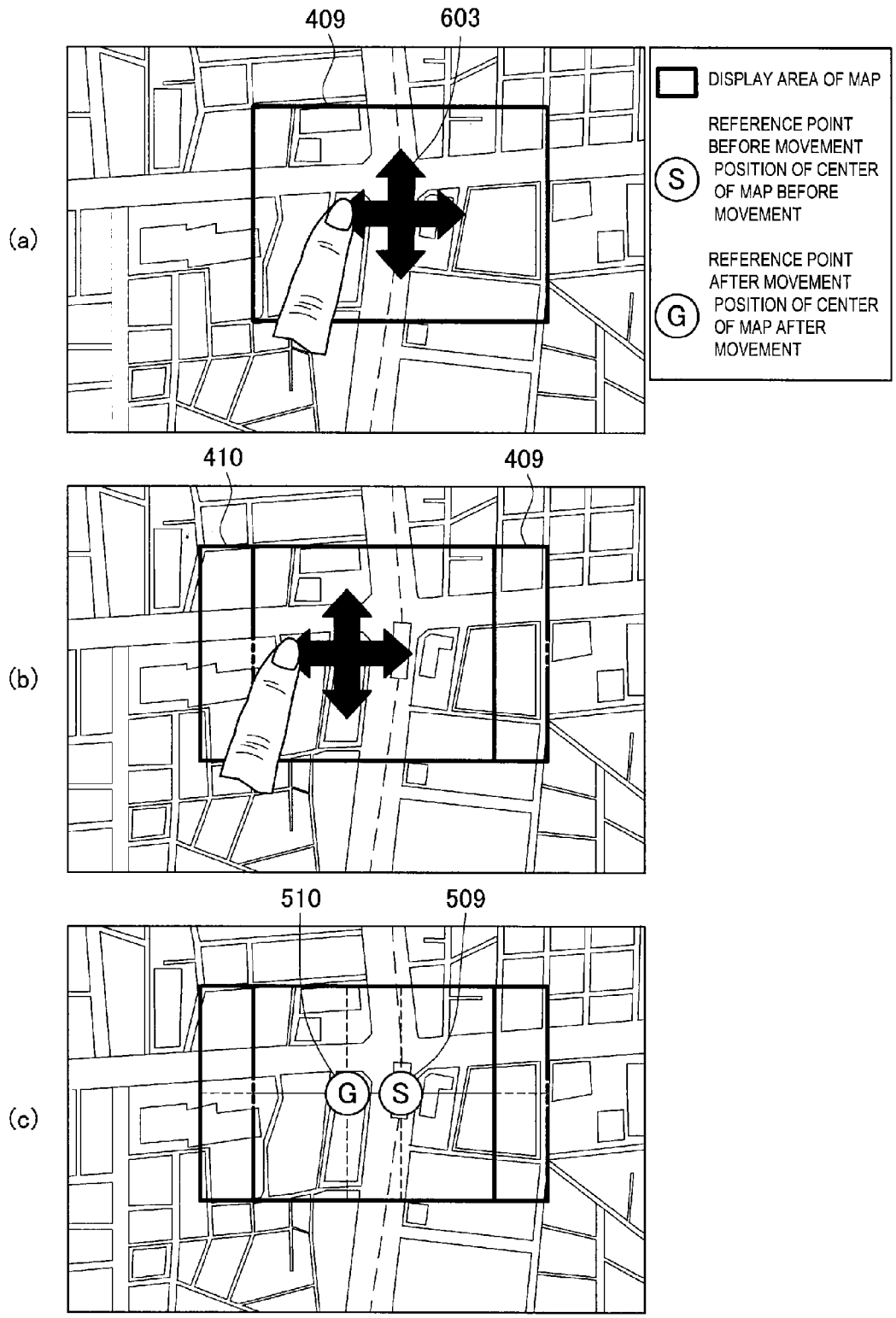
FIG. 12 is an explanatory diagram of a reference point related to determination of a scroll speed in a second modified example of the PND according to the embodiment.

With reference to FIGS. 7 to 12, a method of determining a reference point which is to be a reference when determining a scroll speed will be described by way of examples. FIG. 7 is an explanatory diagram of a reference point related to determination of a scroll speed of the PND according to the present embodiment. FIG. 8 is an explanatory diagram of a destination reference point related to the determination of a scroll speed of the PND according to the present embodiment. FIG. 9 is an explanatory diagram of a reference point related to determination of a scroll speed in a route simulation of the PND according to the present embodiment. FIG. 10 is an explanatory diagram of a reference point related to determination of a scroll speed in a three-dimensional display of the PND according to the present embodiment. FIG. 11 is an explanatory diagram of a reference point related to determination of a scroll speed in a first modified example of the PND according to the present embodiment. FIG. 12 is an explanatory diagram of a reference point related to determination of a scroll speed in a second modified example of the PND according to the present embodiment.

First, referring to FIG. 7, on the map, let us assume that a map within the range of a display area 401 is being displayed on a screen at the current time point. When the user specifies a point 502 within the display area 401, the display control section 158 gradually scrolls the display area such that a display area 402 having the point 502 as its center is displayed.

In this case, the reference point acquisition section 151 may set a point 501, which is a position at the center of the display area 401 before the scrolling, as a first reference point. Further, the reference point acquisition section 151 may set the point 502 specified by the user as a second reference point. At this time, the speed of the scrolling is determined based on the gradient between the point 501 and the point 502.

Further, referring to FIG. 8, the first reference point and the second reference point may be determined further minutely based on the specified position. That is, among a point P1 which is specified, a point P0 which is the center of the display area before the scrolling, and points P3 and P4 which equally divide the line connecting the point P0 with the point P1, the reference point acquisition section 151 may determine sequentially the first reference point and the second reference point, two points at a time in the order of distance from the nearest point from P0. For example, in FIG. 8, when there is displayed the map of the display area having the point P0 as its center, let us assume that the point P1 within the display area is specified by the user. The display control section 158 scrolls the display area of the map until the map of the display area having the specified point P1 as its center is displayed. At this time, the scroll speed may be determined based on the gradient calculated using an altitude difference d1 between the point P0 and the point P1 as described above.

Further, the reference point acquisition section 151 may equally divide (here, into three equal parts) the distance between the point P0 and the point P1, and may determine a reference point such that a scroll speed is determined in each block. In this case, in between the point P0 and the point P3, the reference point acquisition section 151 sets P0 as the first reference point and sets P3 as the second reference point, and the gradient calculation section 153 determines the scroll speed based on the gradient calculated using an altitude difference d2 between the point P0 and the point P3. Further, in between the point P3 and the point P4, the reference point acquisition section 151 sets P3 as the first reference point and sets P4 as the second reference point. Then, the gradient calculation section 153 determines the scroll speed based on the gradient calculated using an altitude difference d3 between the point P3 and the point P4. In the same manner, in between the point P4 and the point P1, the first reference point is the point P4, and the second reference point is the point P1.

Further, the display control section 158 may also have a route simulation function which causes the display area of the map to be scrolled along a movement route acquired by the movement route information acquisition section 157. In this case, as shown in FIG. 9, the map of a display area 403 including a point 503 on a predetermined route 601 is displayed on the screen. Here, there is displayed the map having, as the center of the display area 403, the point 503 on the predetermined route 601. In this case, the reference point acquisition section 151 may set a display area 404 including a point 504 as the second reference point at the center of the display area 404, the point 504 being a point on the predetermined route 601 and being a point moved in a moving direction a predetermined distance from the point 503 that is the center point of the display area 403 at the current time point. In this case, the scroll speed is determined based on the gradient between the point 503 and the point 504. At this time, the display control section 158 may display an icon indicating a point on the movement route in a superimposed manner on the map.

Further, the display control section 158 can also control the display of a three-dimensional display screen. In the three-dimensional display screen, a three-dimensional view, which can be seen in the case where a certain point is set as a camera position, is displayed on the screen, for example. In the case where, at the current time point, a three-dimensional map in which a point 505 is a camera position is displayed and is displayed in such a way as to be scrolled on a route 602, the reference point acquisition section 151 sets the point 505 as the first reference point, and sets a point 506 as the second reference point, the point 506 being a point on the route 602 and being a point moved in a travelling direction a predetermined distance from the point 505.

Note that the display control section 158 may be capable of performing scrolling in accordance with another scroll operation. For example, as shown in FIG. 11, in the case where the user specifies a point 507 within a display area 407 and then the user specifies from the point 507 to a point 509 with a drag operation, that is, in the case where the start point of the drag operation is the point 507 and the end point of the drag operation is the point 509, where the vector joining the point 507 to the point 509 is represented by a vector 701 and the inverse vector of the vector 701 is represented by a vector 702, the display control section 158 may scroll a display area 408, the direction and the length of the scrolling corresponding to the vector 702. At this time, the reference point acquisition section 151 may set the point 507 as the first reference point, and may set a point 508, which the vector 702 having the point 507 as a starting point points at, as the second reference point.

Note that the display control section 158 may also control the display of the map such that the display area of the map is scrolled in a direction opposite to that of FIG. 11. That is, in this case, the point 507 is the first reference point and the point 509 is the second reference point.

Further, as shown in FIG. 12, the display control section 158 may also control the display of the map such that the display area is scrolled based on the operation of the user to a cross-shaped arrow 603 indicating scroll directions. For example, in the case where the map within a display area 409 is displayed on the screen and the user performs an operation of specifying the left direction on the cross-shaped arrow 603 shown on the screen, the display control section 158 may perform control such that the display area of the map is moved horizontally and the map within a display area 410 is displayed. In this case, the reference point acquisition section 151 may set the point 509 which is the center position of the display area 409 as the first reference point, and may set a point 510 as the second reference point, the point 510 being a point moved horizontally with respect to the display screen in the left direction a predetermined distance from the point 509.

Note that, in the PND 10, the tilt of the casing of the PND 10 can be used as an input operation to the PND 10 by using the Z-axis gyro sensor 114 and the Y-axis gyro sensor 116 as a tilt sensor. For example, the display control section 158 detects the tilt of the casing of the PND 10 using the tilt sensor. Then, the display control section 158 may perform control such that the display area of the map is scrolled in accordance with the tilt. In this case, for example, a scroll direction is determined based on the direction of tilt. Further, a scroll speed may be determined in accordance with the degree of tilt. At this time, the scroll speed determination section 154 may set the scroll speed determined based on the degree of tilt of the casing as a predetermined speed which is to be a reference, and the speed may be multiplied by a speed coefficient determined based on the gradient between reference points. In this case, for example, the reference point acquisition section 151 may set, as the first reference point, the center point of the display area of the map that is displayed before tilting the casing of the PND 10, and may set, as the second reference point, the point moved in the scroll direction a predetermined distance from the first reference point. In this way, in the case where the scroll operation is performed using the detected tilt, the reference point acquisition section 151 determines the first reference point and the second reference point until a predetermined time period is elapsed after the detection of the tilt.

2. Second Embodiment

Figure 13:
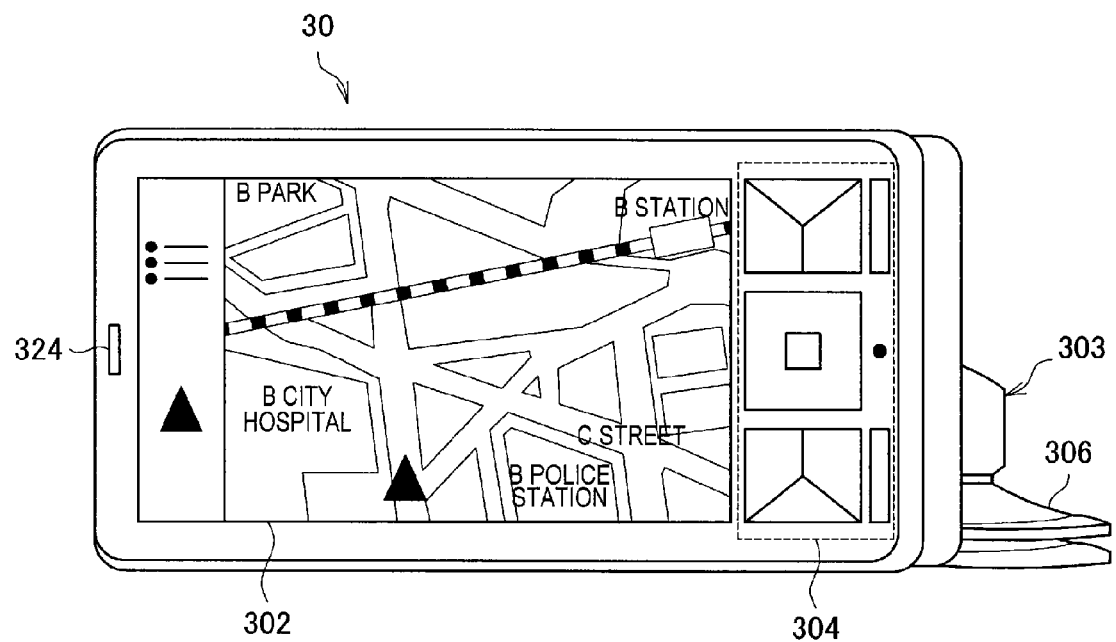
FIG. 13 is an external view of a mobile phone according to a second embodiment of the present disclosure.

Next, with reference to FIGS. 13 and 14, a mobile phone as an example of a map display control device according to a second embodiment of the present disclosure will be described. FIG. 13 is an external view of the mobile phone according to the second embodiment of the present disclosure. Further, FIG. 14 is a block diagram showing a functional configuration of the mobile phone according to the present embodiment.

As shown in FIG. 13, a mobile phone 30 includes a display section 302, an operation section 304, and a speaker 324. Further, in the same manner as the PND 10, the mobile phone 30 may be attached to a vehicle using a suction cup 306 via a cradle 303.

Figure 14:
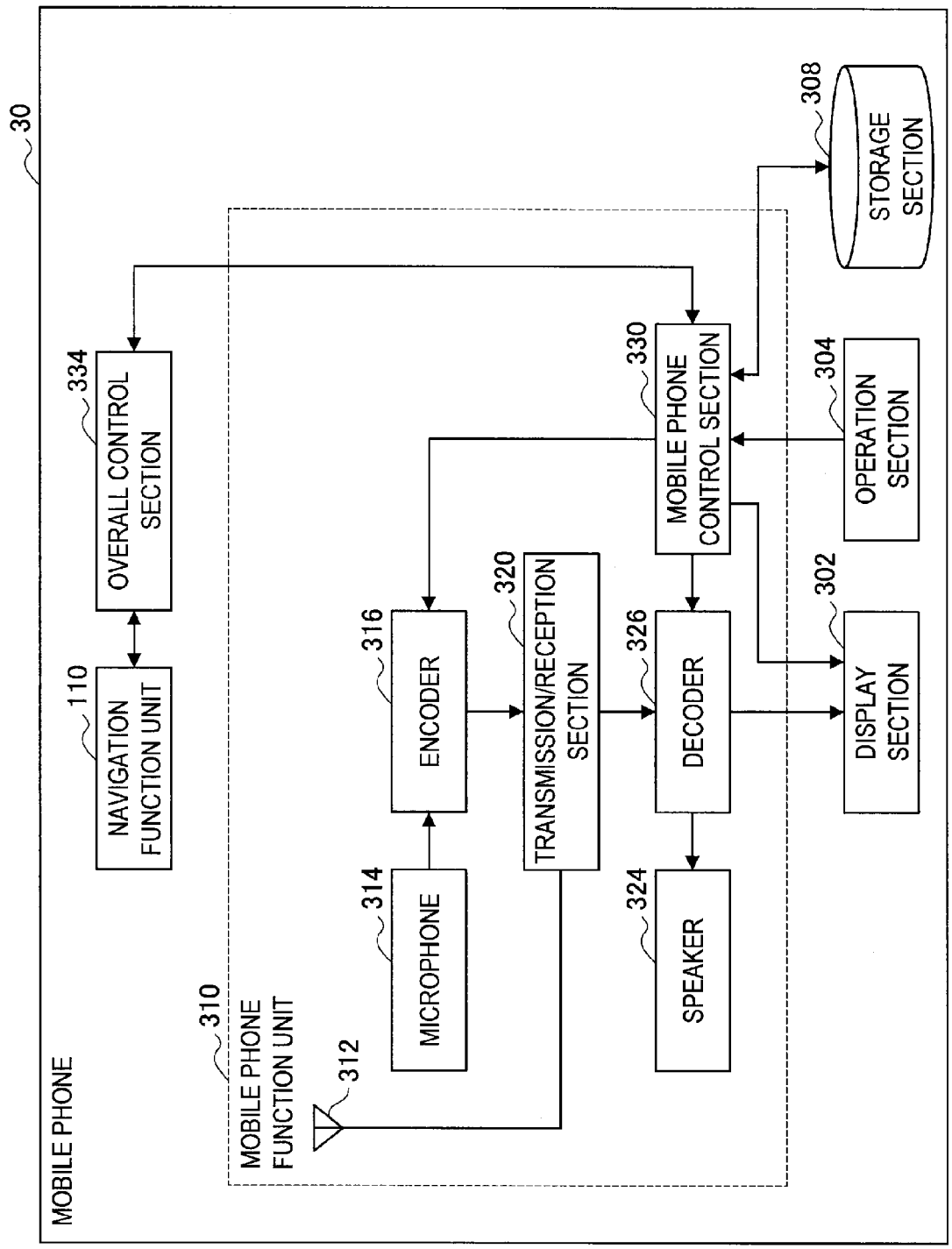
FIG. 14 is a block diagram showing a functional configuration of the mobile phone according to the second embodiment of the present disclosure.

Further, as shown in FIG. 14, the mobile phone 30 mainly includes a navigation function unit 110, a display section 302, an operation section 304, a storage section 308, a mobile phone function unit 310, and an overall control section 334.

The mobile phone function unit 310 is connected to the display section 302, the operation section 304, and the storage section 308. In fact, although it is simplified in the drawing of FIG. 14, the display section 302, the operation section 304, and the storage section 308 are each connected to the navigation function unit 110. Note that, since the detailed configuration of the navigation function unit 110 has been specifically described using FIGS. 2 and 4, the description thereof will be omitted here.

The mobile phone function unit 310 has a configuration for realizing a communication function and an e-mail function, and includes a communication antenna 312, a microphone 314, an encoder 316, a transmission/reception section 320, the speaker 324, a decoder 326, and a mobile phone control section 330.

The microphone 314 collects sound and outputs the sound as an audio signal. The encoder 316 performs digital conversion and encoding of the audio signal input from the microphone 314 in accordance with the control of the mobile phone control section 330, and outputs audio data to the transmission/reception section 320.

The transmission/reception section 320 modulates the audio data input from the encoder 316 in accordance with a predetermined system, and transmits the modulated audio data to a base station of the mobile phone 30 from the communication antenna 312 via radio waves. Further, the transmission/reception section 320 demodulates a radio signal received by the communication antenna 312 and acquires audio data, and outputs the audio data to the decoder 326.

The decoder 326 performs decoding and analog conversion of the audio data input from the transmission/reception section 320 in accordance with the control of the mobile phone control section 330, and outputs an audio signal to the speaker 324. The speaker 324 outputs the audio based on the audio signal supplied from the decoder 326.

Further, in the case of receiving an e-mail, the mobile phone control section 330 supplies the decoder 326 with received data from the transmission/reception section 320, and causes the decoder 326 to decode the received data. Then, the mobile phone control section 330 outputs e-mail data obtained by the decoding to the display section 302 and causes the display section 302 to display the e-mail data, and also records the e-mail data in the storage section 308.

Further, in the case of transmitting an e-mail, the mobile phone control section 330 causes the encoder 316 to encode the e-mail data which is input via the operation section 304, and transmits the encoded e-mail data via radio waves through the transmission/reception section 320 and the communication antenna 312.

The overall control section 334 controls the mobile phone function unit 310 and the navigation function unit 110. For example, in the case of receiving a phone call while the navigation function unit 110 is executing a navigation function, the overall control section 334 may temporarily switch its function from the navigation to a verbal communication carried out by the mobile phone function unit 310, and, when the call ends, may cause the navigation function unit 110 to restart the navigation function.

3. Examples of Effects

As described above, according to the map display control device of one embodiment of the present disclosure, the speed of scrolling the display area of the map is determined based on the gradient between two points which are to be references when displaying a map. At this time, in the case where a route in a moving direction is an upward slope, the scroll speed slows down, and in the case where a route in the moving direction is a downward slope, the scroll speed increases, and hence, the user can physically sense the topography on the map.

It should be understood by those skilled in the art that various modifications, combinations, sub-combinations and alterations may occur depending on design re-quirements and other factors insofar as they are within the scope of the appended claims or the equivalents thereof.

For example, in the embodiments above, although it is described that the map display control device is a PND or a mobile phone, the present disclosure is not limited to such an example. For example, the map display control device may be an information processing apparatus such as a PC (Personal Computer), a video processing apparatus for home use (such as a DVD recorder and a video cassette recorder), a PDA (Personal Digital Assistants), a game device for home use, and a consumer electronics device. Further, the map display control device may also be an information processing apparatus such as a portable music reproduction device, a portable video processing device, and a portable game device.

Further, in the embodiments above, although the description has been made on the map display control device which determines the scroll speed of the map based on the gradient between two points and the transportation means used by the user, the present disclosure is not limited to such an example. For example, the map display control device may determine the scroll speed based on the gradient between two points, re-gardless of the transportation means used by the user.

Further, in the embodiments above, the description has been made on the reference point used when determining the scroll speed of the map display control device, for each pattern of the scroll operation. The map display control device may respond to a plurality of scroll operation patterns. In this case, the map display control device determines the reference point in accordance with the scroll operation pattern that is used at the time point of controlling the display of the map. Alternatively, the map display control device may respond to any one of the patterns of scroll operation. Further, in the embodiments above, the description has been made on the map display control device having the route simulation function and the three-dimensional map display function. However, the map display control device may not necessarily have the route simulation function and the three-dimensional map display function. Further, the map display control device may have one of the route simulation function or the three-dimensional map display function.

Further, in the embodiments above, as it has been described in FIGS. 7 and 8, in the case where the scrolling is performed until the map having a specified point as its center is displayed, the scroll speed determination section 154 further minutely changed the scroll speed based on the altitude value of the divided point between the first reference point and the second reference point, but the present disclosure is not limited to such an example. For example, the altitude value of the divided point may be used for each scroll pattern described above.

Note that in the present specification, the steps written in the flowchart may of course be processed in chronological order in accordance with the stated order, but may not necessarily be processed in the chronological order, and may be processed individually or in a parallel manner. It is needless to say that, in the case where the steps are processed in the chronological order, the order of the steps may be changed appropriately according to circumstances.

It should be noted that the present disclosure can also take the following config-urations.

(1) A map display control device including:
a reference point acquisition section which acquires position information of a first reference point which is a point within a display area that is an area displayed before the display area of a map is scrolled, and position information of a second reference point which is to be a reference of the display area of the map of a scroll destination;
an altitude difference acquisition section which acquires a difference in altitude between the first reference point and the second reference point;
a gradient calculation section which calculates a gradient between the first reference point and the second reference point based on a distance between the first reference point and the second reference point and the altitude difference;
a speed determination section which determines a speed of the scrolling based on the gradient; and
a display control section which controls display of the map such that the display area of the map is scrolled at the speed determined by the speed determination section.

(2) The map display control device according to (1), wherein the speed determination section determines the speed based on a transportation means used by a user and the gradient.

(3) The map display control device according to (2),
wherein, when the transportation means is a bicycle, the speed determination section makes an effect of the gradient on the speed greater than in a case where the transportation means is a car.

(4) The map display control device according to (3),
wherein the speed determination section determines the speed of the scrolling by multiplying a predetermined speed by a speed coefficient, and
wherein the speed coefficient is a value smaller than 1 when the gradient is a positive value, and is a value larger than 1 when the gradient is a negative value.

(5) The map display control device according to (4), further including
a tilt sensor which detects a tilt of a casing of the map display control device,
wherein the display control section controls the display of the map such that the display area of the map is scrolled based on a direction of the tilt detected by the tilt sensor, and
wherein the speed determination section determines the speed of the scrolling by multiplying the predetermined speed determined based on a degree of the tilt by the speed coefficient.
(6) The map display control device according to (1), further including
a movement route information acquisition section which acquires movement route information,
wherein the display control section scrolls the display area of the map in accordance with the movement route information, and
wherein the reference point acquisition section sets the first reference point and the second reference point as points on a movement route.
(7) The map display control device according to (6),
wherein the display control section superimposes an icon, which moves on the movement route, on the map, and also scrolls the display area of the map in accordance with movement of the icon.
(8) The map display control device according to (7),
wherein the reference point acquisition section acquires the position information of the first reference point which is a current position of the icon, and the position information of the second reference point which is a point on the movement route and is the point moved in a moving direction a predetermined distance from the current position, and
wherein the display control section displays the map of a display area having the icon as a center thereof.
(9) The map display control device according to (1),
wherein the map is a three-dimensional map,
wherein the display control section displays a video seen from a viewpoint position inside the three-dimensional map, and
wherein the reference point acquisition section acquires the position information of the first reference point which is the viewpoint position before the scrolling, and the position information of the second reference point which is the viewpoint position of the scroll destination.
(10) The map display control device according to (1),
wherein the reference point acquisition section determines the first reference point and the second reference point based on a position at a center of the display area before the scrolling and a position specified within the display area before the scrolling.
(11) The map display control device according to (10),
wherein the reference point acquisition section acquires the position information of the first reference point which is the position at the center of the display area before the scrolling, and the position information of the second reference point which is the position specified within the display area before the scrolling, and
wherein, when the position within the display area before the scrolling is specified, the display control section performs control such that a map of a display area having the specified position as a center thereof is displayed.
(12) The map display control device according to (10),
wherein the reference point acquisition section sets sequentially, as the first reference point and the second reference point, two points at a time in the order of distance from the nearest point from the first reference point among the specified position, the position at the center of the display area before the scrolling, and a point which equally divides a line connecting the specified position with the position at the center of the display area before the scrolling, and
wherein the display control section controls the display of the map such that the display area of the map is scrolled until the specified position coincides with the center of the display area.
(13) The map display control device according to (1),
wherein the display control section controls the display of the map such that the display area of the map is scrolled in accordance with a drag operation to a screen in which the map is displayed, and
wherein the reference point acquisition section acquires the position information of the first reference point determined based on a start position of the drag operation, and the position information of the second reference point determined based on an end position of the drag operation.
(14) The map display control device according to (13),
wherein the reference point acquisition section sets the start position of the drag operation as the first reference point, and sets the end position of the drag operation as the second reference point, and
wherein the display control section controls the display of the map such that the display area is scrolled in a direction of a vector joining the start position of the drag operation to the end position of the drag operation, a distance corresponding to a length of the vector.
(15) The map display control device according to (13),
wherein the reference point acquisition section sets the start position of the drag operation as the first reference point, and sets, as the second reference point, a point moved from the first reference point as a starting point in a direction of a vector joining the end position of the drag operation to the start position of the drag operation, a distance of the movement being equal to a length of the vector, and
wherein the display control section controls the display of the map such that the display area is scrolled in a direction of a vector joining the first reference point to the second reference point, a distance corresponding to a length of the vector.
(16) A map display control method comprising:
acquiring position information of a first reference point which is a point within a display area that is an area displayed before the display area of a map is scrolled, and position information of a second reference point which is to be a reference of the display area of the map of a scroll destination;
acquiring a difference in altitude between the first reference point and the second reference point;
calculating a gradient between the first reference point and the second reference point based on a distance between the first reference point and the second reference point and the altitude difference;
determining a speed of the scrolling based on the gradient; and
controlling display of the map such that the display area of the map is scrolled at the determined speed.
(17) A program for causing a computer to function as a map display control device including
a reference point acquisition section which acquires position information of a first reference point which is a point within a display area that is an area displayed before the display area of a map is scrolled, and position information of a second reference point which is to be a reference of the display area of the map of a scroll destination,
an altitude difference acquisition section which acquires a difference in altitude between the first reference point and the second reference point, a gradient calculation section which calculates a gradient between the first reference point and the second reference point based on a distance between the first reference point and the second reference point and the altitude difference, a speed determination section which determines a speed of the scrolling based on the gradient, and a display control section which controls display of the map such that the display area of the map is scrolled at the speed determined by the speed determination section.

REFERENCE SIGNS LIST

10 PND (map display control device)
12 Display section
102 Storage section
104 Operation section
106 Audio output section
110 Navigation function unit
112 GPS antenna
114 Z-axis gyro sensor
116 Y-axis gyro sensor
118 3-axis acceleration sensor
120 Geomagnetic sensor
122 Pressure sensor
132 GPS processing section
134 Angle calculation section
136 Position calculation section
138 Speed calculation section
140 Attitude angle detection section
142 Azimuth calculation section
144 Altitude calculation section
150 Navigation section
151 Reference point acquisition section
152 Altitude difference acquisition section
153 Gradient calculation section
154 Scroll speed determination section
155 Position information correction section
156 Route search section
157 Movement route information acquisition section
158 Display control section
159 Operation mode-switching section
30 Mobile phone (map display control device)

The invention claimed is:

1. An information processing apparatus comprising:
a processor that:
controls a display to display map data of a map;
acquires first altitude data corresponding to a first point on the displayed map data and second altitude data corresponding to a second point on the displayed map data; and
controls the display to scroll the map between the first point and the second point based on a difference between the first altitude data and the second altitude data.

2. The information processing apparatus of claim 1, further comprising:
a position detecting unit configured to detect a current position of the information processing apparatus,
wherein the processor controls the display to display the current position of the information processing apparatus on the map data.

3. The information processing apparatus of claim 2, wherein the first point corresponds to the current position of the information processing apparatus displayed on the map data.

4. The information processing apparatus of claim 2, wherein the processor controls the display to display the map data so that the current position of the information processing apparatus is displayed at the center of the display.

5. The information processing apparatus of claim 2, wherein the processor is configured to display a route on the displayed map data, and control the display to scroll in a direction following the displayed route, and the first and second points are points on the displayed route.

6. The information processing apparatus of claim 1, wherein the processor receives an input for selecting the second point on the displayed map data.

7. The information processing apparatus of claim 1, wherein the processor acquires first position data corresponding to the first point and second position data corresponding to the second point, and calculates a distance between the first point and the second point based on the first position data and the second position data.

8. The information processing apparatus of claim 7, wherein the processor calculates a gradient between the first point and the second point based on the calculated distance between the first point and the second point and the difference between the first altitude data and the second altitude data, and
controls the display to scroll the map at a predetermined speed between the first point and the second point based on the calculated gradient.

9. The information processing apparatus of claim 8, wherein the processor controls the display to scroll the map at a first speed between the first point and the second point when the gradient is a positive value, and controls the display to scroll the map at a second speed between the first point and the second point when the gradient is a negative value, and
wherein the second speed is greater than the first speed.

10. The information processing apparatus of claim 8, wherein the processor is configured to receive an input for selecting one of a plurality of modes of transportation.

11. The information processing apparatus of claim 10, wherein in a case in which the selected mode of transportation is a bicycle, an effect of the gradient on the predetermined scrolling speed is greater compared to another case in which the selected mode of transportation is a car.

12. The information processing apparatus of claim 10, wherein in an event the selected mode of transportation is a bicycle, the processor controls the display to scroll at a speed such that the speed decreases with respect to a positive slope and increases with respect to a negative slope compared to another event in which the selected mode of transportation is a car.

13. The information processing apparatus of claim 1, further comprising:
a tilt sensor configured to detect a degree of tilt of the information processing apparatus,
wherein the processor is configured to control the display to scroll the map at a speed determined based on the degree of tilt detected by the tilt sensor.

14. The information processing apparatus of claim 1, wherein the display is a three-dimensional display and the map is displayed in a three-dimensional view.

15. The information processing apparatus of claim 1, wherein the processor is configured to:
determine a plurality of reference points between the first point and the second point;
acquire altitude data corresponding to each of the plurality of reference points; and
control the display to scroll the map between the first point and the second point based on a difference between the altitude data corresponding to each of the plurality of reference points.

16. The information processing apparatus of claim 15, wherein the plurality of reference points are equally spaced between the first point and the second point.

17. The information processing apparatus of claim 1, further comprising:
a touch-panel interface configured to receive a touch input for selecting the first point and the second point by touching the touch-panel interface at the first point and dragging the map to the second point.

18. The information processing apparatus of claim 17, wherein the processor controls the display to scroll the map data in a distance and a direction corresponding to a difference between the first point and the second point based on the touch input received at the touch-panel interface.

19. The information processing apparatus of claim 17, wherein the processor controls the display to scroll the map data in a distance and a direction opposite to a direction corresponding to a vector connecting the first point and the second point based on the touch input received at the touch-panel interface.

20. A method performed by an information processing apparatus, the method comprising:
controlling, by a processor, a display to display map data of a map;
acquiring, by the processor, first altitude data corresponding to a first point on the displayed map data and second altitude data corresponding to a second point on the displayed map data; and
controlling, by the processor, the display to scroll the map between the first point and the second point based on a difference between the first altitude data and the second altitude data.

21. A non-transitory computer-readable medium having stored thereon, a set of computer-executable instructions, which when executed by an information processing apparatus, cause the information processing apparatus to perform a method comprising:
controlling a display to display map data of a map;
acquiring first altitude data corresponding to a first point on the displayed map data and second altitude data corresponding to a second point on the displayed map data; and
controlling the display to scroll the map between the first point and the second point based on a difference between the first altitude data and the second altitude data.

\* \* \* \* \*